July 2, 1957
H. E. HELGESON
2,797,934
SHOCK ABSORBING TRAILER HITCH
Filed Dec. 17, 1954
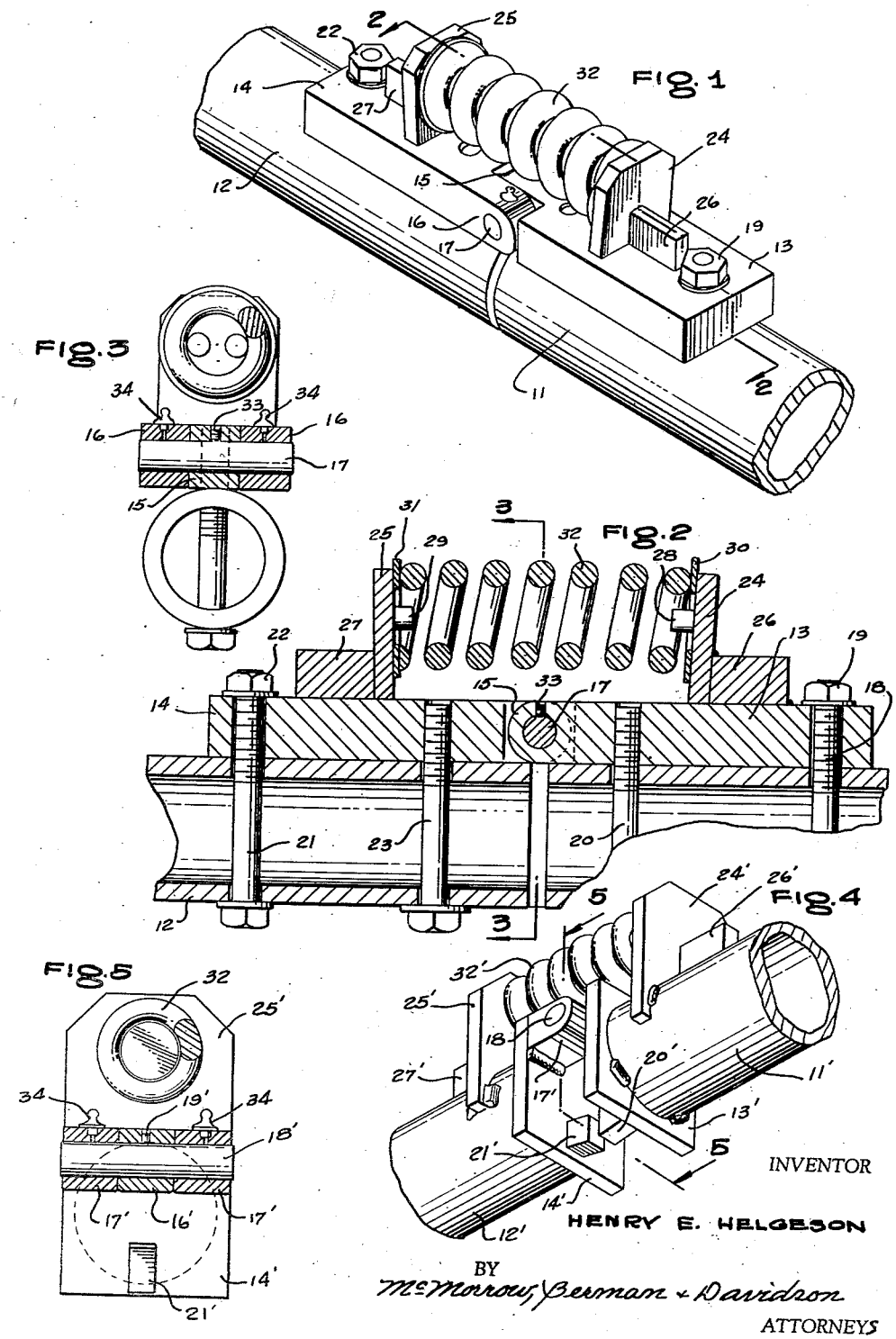
INVENTOR
HENRY E. HELGESON
BY
McMorrow, Berman & Davidson
ATTORNEYS United States Patent Office 2,797,934
Patented July 2, 1957

2,797,934

SHOCK ABSORBING TRAILER HITCH

Henry E. Helgeson, Gay Mills, Wis.

Application December 17, 1954, Serial No. 475,906

1 Claim. (Cl. 280—489)

This invention relates to hitch devices for use in interconnecting a trailer and a tractor vehicle, and more particularly to a cushioned trailer hitch providing a resilient connection between the tractor vehicle and the trailer vehicle.

The main object of the invention is to provide a novel and improved trailer tow device which is simple in construction, which is easy to install, and which cushions the connection between the tractor vehicle and the trailer vehicle against the effects of road shock and vibration.

A further object of the invention is to provide an improved shock absorbing trailer tow device which is inexpensive to fabricate, which is rugged in construction, and is particularly designed to protect delicate towed machinery from road shocks and other impacts generated by towing equipment, as well as to protect the towing equipment from the road shocks produced by heavy or heavily loaded trailers or other hauled equipment.

Further objects and advantages of the invention will become apparent from the following description and claim, and from the accompanying drawings, wherein:

Figure 1 is a fragmentary view showing an improved trailer tow device according to the present invention.

Figure 2 is an enlarged longitudinal vertical cross sectional view taken on the line 2—2 of Figure 1.

Figure 3 is a transverse vertical cross sectional view taken on the line 3—3 of Figure 2.

Figure 4 is a fragmentary perspective view of a modified form of trailer tow device according to the present invention.

Figure 5 is an enlarged transverse vertical cross sectional view taken on the line 5—5 of Figure 4.

Referring to the drawings, and more particularly to Figures 1, 2 and 3, 11 designates a hitch bar which may be rigidly secured to a towing vehicle, such as a tractor, or the like, and 12 designates a second hitch bar adapted to be rigidly secured to a trailer vehicle. The hitch bars 11 and 12 are hingedly connected together by a first relatively thick plate member 13 secured on the hitch bar 11 and a second relatively thick plate member 14 secured on the hitch bar 12, the plate member 13 having the hinge tongue 15 which is received between the hinge lugs 16, 16 on the plate member 14, as shown in Figure 3, and which is rotatably connected therebetween by the transversely extending hinge pin 17 which is located immediately above and in the transverse vertical plane of the ends of the hitch bars 11 and 12.

As shown in Figure 2, the plate member 13 is secured to the hitch bar 11 by a first bolt 18 which extends upwardly through the hitch bar and through the rear portion of the plate member 13, and is provided with the fastening nut 19. A second bolt 20 extends up through the hitch bar 11 and is threadedly engaged with the plate member 13. Similarly, the plate member 14 is secured to the hitch bar 12 by a first bolt 21 extending through the hitch bar 12 and through the plate member 14, said bolt being provided with the fastening nut 22. A second bolt 23 extends through the hitch bar and is threadedly engaged with the plate member 14. As shown, the respective bolts 20 and 23 are located on opposite sides of and are adjacent to the hinged connection between the plate members 13 and 14.

Rigidly secured on the respective plate members 13 and 14 are the transversely extending, upstanding abutment plates 24 and 25, said abutment plates being rigidly braced to the respective plate members 13 and 14 by the rectangular abutment blocks 26 and 27 welded to the outer surfaces of the upstanding plates 24 and 25 and to the top surfaces of the plate members 13 and 14, as shown in Figure 2. The abutment plates 24 and 25 are provided with the inwardly projecting centering studs 28 and 29 which are arranged in alignment and around which are positioned respective washers 30 and 31. A heavy coiled spring 32 is positioned between the washers 30 and 31, each end of the coil surrounding a respective stud 28 or 29.

As is clearly shown in Figures 2 and 3, the hinge pin 17 is secured to the hinge tongue 15 by a set screw 33 threaded through the hinge tongue above the hinge pin 17 and clampingly engaged with the intermediate portion of the hinge pin.

Suitable grease fittings 34, 34 are provided on the hinge lugs 16, 16 above the hinge pin 17, to insure lubrication of the hinge joint between the plate members 13 and 14.

As will be readily apparent, the coiled spring 32 being of substantial strength, cushions the hinge joint against severe swinging movement and serves to absorb road shocks, whereby both the towed and towing vehicles are protected from excessive vibration and from sudden impact.

Referring now to the modified form of the invention, shown in Figures 4 and 5, 11' designates the hitch bar rigidly secured to the towing vehicle and 12' designates the hitch bar rigidly secured to the trailer vehicle. Transversely secured to the ends of the bars 11' and 12' are the respective plate members 13' and 14' which are thus arranged in parallel opposing relationship. The plate member 13' is provided with a hinge tongue 16' which is received between a pair of hinge tongues 17', 17' secured on the plate member 14', the hinge tongues being connected by a transverse hinge pin 18', said hinge pin being secured to the hinge tongue 16' by a set screw 19' provided on the hinge tongue 16', as is clearly shown in Figure 5. Respective stop lugs 20' and 21' are secured to the plate members 13' and 14' adjacent their lower edges and in opposition to each other to limit the movement of the plate members 13' and 14' towards each other when said plate members swing around the hinge joint defined by the hinge pin 18' and the respective interengaging hinge tongues 16' and 17'. As will be clearly apparent from Figures 4 and 5, the hinge axis defined by the hinge pin 18' is located above the axes of the bar members 11' and 12' and extends transverse to said axes.

Rigidly secured on the respective hitch bars 11' and 12' are the upstanding, transversely extending plate members 24' and 25', said plate members being rigidly braced to the respective hitch bars 11' and 12' by the rectangular brace blocks 26' and 27'. A heavy coiled spring 32' is disposed between the plate members 24' and 25' in the same manner as in the previously described form of the invention, said spring being supported on respective studs provided on the plate members 24' and 25'. As in the previously described form of the invention, the spring 32' serves to cushion road shocks and to allow swinging movement of the hitch bars 11' and 12' relative to each other, thus preventing damage to the towing and trailer vehicles.

While certain specific embodiments of an improved trailer tow device have been disclosed in the foregoing description, it will be understood that various modifications within the spirit of the invention may occur to those skilled in the art. Therefore, it is intended that no limitations be placed on the invention except as defined by the scope of the appended claim.

What is claimed is:

A trailer tow device comprising a first hitch bar adapted to be rigidly secured to a towing vehicle, a second hitch bar adapted to be rigidly secured to a trailer vehicle, respective plate members rigidly secured on said hitch bars, transverse hinge means rotatably connecting the ends of said plate members, said hinge means being located with its hinge axis above and spaced midway between the ends of said hitch bars, said ends being spaced apart when the bars are horizontal, respective upstanding abutment members on said hitch bars, said abutment members being spaced on opposite sides of said transverse hinge means, opposing stud elements on said abutment members above said hinge means, and a coiled spring mounted between said abutment members and having its opposite ends engaged respectively on said stud elements whereby said spring cushions upward rotation of one hitch bar relative to the other, and whereby downward rotation of one hitch bar relative to the other is positively limited by the abutment of the inner ends of the hitch bars.

References Cited in the file of this patent

UNITED STATES PATENTS 2,634,986     McDaniel _____ Apr. 14, 1953

FOREIGN PATENTS 224,641     Great Britain _____ Nov. 20, 1924